United States Patent
Wockatz et al.

(10) Patent No.: US 11,047,073 B2
(45) Date of Patent: Jun. 29, 2021

(54) METHOD FOR PRODUCING A TEXTILE UNIDIRECTIONAL FABRIC

(71) Applicants: TEIJIN CARBON EUROPE GMBH, Wuppertal (DE); TEIJIN LIMITED, Osaka (JP)

(72) Inventors: Ronny Wockatz, Höchstadt (DE); Dirk Ortmanns, Wegberg (DE); Shuhei Yoshida, Tokyo (JP); Yosuke Nakamura, Tokyo (JP); Hidekazu Yoshikawa, Tokyo (JP)

(73) Assignees: TOHO TENAX EUROPE GMBH, Wuppertal (DE); TOHO TENAX CO., LTD., Tokyo (JP)

( * ) Notice: Subject to any disclaimer, the term of this patent is extended or adjusted under 35 U.S.C. 154(b) by 39 days.

(21) Appl. No.: 16/500,273

(22) PCT Filed: Mar. 29, 2018

(86) PCT No.: PCT/EP2018/058128
§ 371 (c)(1),
(2) Date: Oct. 2, 2019

(87) PCT Pub. No.: WO2018/184992
PCT Pub. Date: Oct. 11, 2018

(65) Prior Publication Data
US 2020/0392655 A1   Dec. 17, 2020

(30) Foreign Application Priority Data

Apr. 3, 2017  (EP) ..................................... 17164528
Dec. 1, 2017  (JP) ............................. JP2017-231749

(51) Int. Cl.
*D03D 13/00*    (2006.01)
*B32B 5/02*     (2006.01)
(Continued)

(52) U.S. Cl.
CPC ............ *D03D 13/004* (2013.01); *B32B 5/022* (2013.01); *B32B 5/024* (2013.01); *B32B 5/26* (2013.01);
(Continued)

(58) Field of Classification Search
CPC ............ B32B 5/02; B32B 5/022; B32B 5/024; B32B 5/26; B32B 5/28; B32B 5/08;
(Continued)

(56) References Cited

U.S. PATENT DOCUMENTS

| | | | |
|---|---|---|---|
| 4,407,885 A | * | 10/1983 | Murphy ................ D06M 23/06 442/212 |
| 4,680,213 A | | 7/1987 | Fourezon |

(Continued)

FOREIGN PATENT DOCUMENTS

| | | |
|---|---|---|
| DE | 35 35 272 A1 | 4/1987 |
| DE | 198 09 264 A1 | 9/1999 |

(Continued)

OTHER PUBLICATIONS

Jun. 11, 2018 International Search Report issued in International Patent Application No. PCT/EP2018/058128.

*Primary Examiner* — Philip C Tucker
*Assistant Examiner* — Brian R Slawski
(74) *Attorney, Agent, or Firm* — Oliff PLC

(57) ABSTRACT

Method for producing a textile unidirectional fabric, wherein at least one planar layer of multi-filament reinforcement threads arranged parallel to each other are woven with each other over transverse threads, wherein transverse threads having core-sheath structure and titer of 10 to 40 tex are used as transverse threads, wherein transverse threads have a first component, which structures sheath, and second component, which structures core, wherein first component has lower melting temperature than second component, first (Continued)

Figure 1:
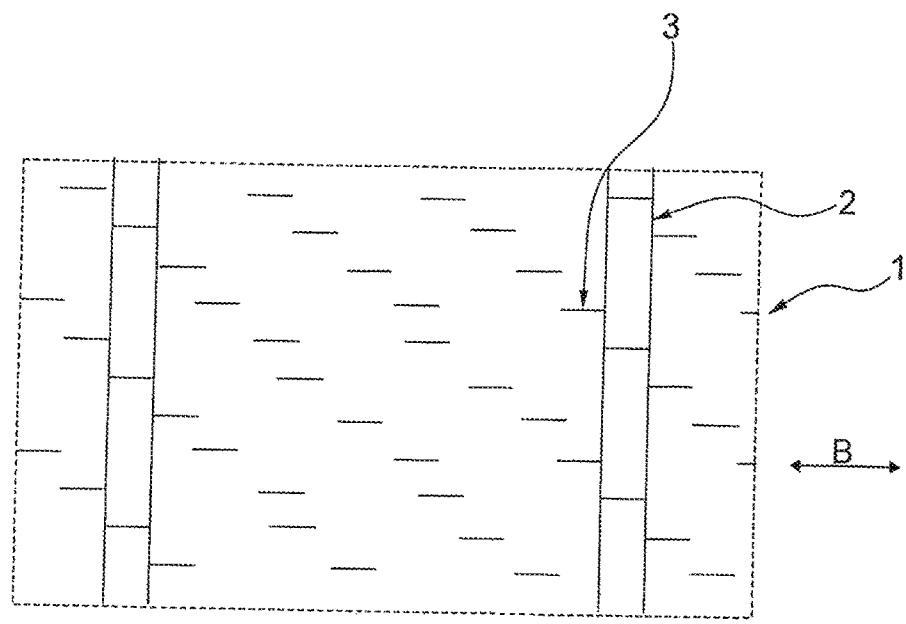

component is meltable thermoplastic polymer material and, via first component of transverse threads, adjacently arranged multi-filament reinforcement threads are connected to each other by hot melting, wherein alleys are formed in unidirectional fabric by interweaving multi-filament reinforcement threads together with transverse threads, by means of which a permeability of 10 to 600 l/dm2/min can be established. Preferred embodiment relates to method for producing unidirectional fabric having fleece. Further, a fiber preform, produced from unidirectional fabric.

17 Claims, 2 Drawing Sheets

(51) Int. Cl.
| | |
|---|---|
| *B32B 5/26* | (2006.01) |
| *B32B 37/12* | (2006.01) |
| *D03D 15/47* | (2021.01) |
| *B32B 5/28* | (2006.01) |
| *B32B 5/08* | (2006.01) |
| *B32B 5/10* | (2006.01) |
| *B29C 70/08* | (2006.01) |
| *B29C 65/02* | (2006.01) |
| *B29C 70/22* | (2006.01) |

(52) U.S. Cl.
CPC ............ *B32B 37/12* (2013.01); *D03D 15/47* (2021.01); *B29C 65/02* (2013.01); *B29C 70/085* (2013.01); *B29C 70/222* (2013.01); *B29C 70/226* (2013.01); *B32B 5/08* (2013.01); *B32B 5/10* (2013.01); *B32B 5/28* (2013.01); *B32B 2260/023* (2013.01); *B32B 2262/0261* (2013.01); *B32B 2262/106* (2013.01); *B32B 2262/12* (2013.01)

(58) Field of Classification Search
CPC ..... B32B 5/10; B32B 37/12; B32B 2260/023; B32B 2262/0261; B32B 2262/106; B32B 2262/12; B29C 65/00; B29C 65/02; B29C 65/48; B29C 65/72; B29C 70/00; B29C 70/08; B29C 70/083; B29C 70/085; B29C 70/22; B29C 70/222; B29C 70/226; D03D 13/004; D03D 13/008; D03D 15/267; D03D 15/47; D10B 2101/06; D10B 2101/12; D10B 2331/02; D10B 2331/04
USPC ........... 156/60, 182, 196, 221, 307.1, 307.3, 156/308.2, 308.4, 309.6, 324, 324.4, 156/330.9; 264/257, 258, 642; 428/98, 428/174, 175, 219, 220, 221, 304.4, 332, 428/339, 340, 378, 408; 442/179, 181, 442/187, 199, 200, 203, 208, 209, 210, 442/212, 213, 215, 216, 268
See application file for complete search history.

(56) References Cited

U.S. PATENT DOCUMENTS

| | | | |
|---|---|---|---|
| 5,212,010 A | 5/1993 | Curzio et al. | |
| 6,995,099 B1 * | 2/2006 | Nishimura | ............ B29C 70/083 |
| | | | 442/59 |
| 2004/0219855 A1 * | 11/2004 | Tsotsis | ................. B29C 70/443 |
| | | | 442/364 |
| 2005/0164578 A1 | 7/2005 | LoFaro et al. | |
| 2006/0252334 A1 | 11/2006 | LoFaro et al. | |
| 2007/0202762 A1 | 8/2007 | Hirawaki et al. | |
| 2008/0289743 A1 | 11/2008 | Tsotsis | |

FOREIGN PATENT DOCUMENTS

| | | | |
|---|---|---|---|
| EP | 0 193 479 A1 | 9/1986 | |
| EP | 0 323 571 A2 | 7/1989 | |
| EP | 0 672 776 A1 | 9/1995 | |
| EP | 1 057 605 A1 | 12/2000 | |
| EP | 1 125 728 A1 | 8/2001 | |
| EP | 1 408 152 A1 | 4/2004 | |
| EP | 1 473 132 A2 | 11/2004 | |
| EP | 1 705 269 A1 | 9/2006 | |
| EP | 2 233 625 A1 | 9/2010 | |
| WO | WO-9734034 A1 * | 9/1997 | ......... D03D 15/0094 |
| WO | 02/16481 A1 | 2/2002 | |
| WO | 02/057527 A1 | 7/2002 | |
| WO | 2006/111037 A1 | 10/2006 | |
| WO | 2017/055025 A1 | 4/2017 | |

\* cited by examiner

METHOD FOR PRODUCING A TEXTILE UNIDIRECTIONAL FABRIC

The invention relates to a method for producing a textile unidirectional fabric (also called simply unidirectional fabric) from reinforcement fibres, and to a fibre preform for producing composite components, wherein the fibre preform is produced from the unidirectional fabric.

The invention is a further development of an invention described in International Application PCT/EP 2016/070959.

Scrims of reinforcement fibres or threads, especially in the form of unidirectional fabrics, have long been known in the market. These scrims or unidirectional fabrics are widely used to produce composite components with complex structures. In this case, so-called fibre preforms are first made of scrims or unidirectional fabrics for the production of composite components in an intermediate step, to form textile semi-finished products in the form of two-dimensional or three-dimensional structures of reinforcement fibres whose shape may almost correspond to the same shape of the final component. In embodiments of such fibre preforms, which essentially consist of only the reinforcement fibres and in which the preparation matrix fraction required for the component is still at least largely absent, a suitable matrix material is introduced in the fibre preform in further steps by infusion or injection, also by using vacuum. Finally, the matrix material is cured at generally elevated temperatures and pressures to obtain the finished component. Known methods for infusing or injecting the matrix material may include the so-called liquid moulding (LM) method or related methods such as e.g. Resin Transfer Moulding (RTM), Vacuum Assisted Resin Transfer Moulding (VARTM), Resin Film Infusion (RFI), Liquid Resin Infusion (LRI) or Resin Infusion Flexible Tooling (RIFT).

To produce the fibre preforms, the scrims or unidirectional fabrics without matrix material may be superimposed on one another in several layers with a shape adapted to the contour of the component until the desired thickness is achieved. In other instances, multiple layers of scrims or non-wovens may be initially stacked and formed into a dry multiaxial scrim, e.g. connected by threads. The reinforcement fibres of the individual layers may be aligned parallel to each other or, alternatively, traverse each other. Typically, multiaxial angles of 0°, 90°, plus or minus 25°, plus or minus 30°, plus or minus 45°, or plus or minus 60°, are set, and the design chosen to give a structure that is symmetrical relative to the zero-degree direction. These multiaxial sheets may then be easily processed into preforms.

In many cases, multiaxial sheets may comprise a thermoplastic polymer component melting at relatively low temperatures, e.g. in the form of threads or in the form of a polymer material additionally applied to the multifilament reinforcement threads. The preform may thus be obtained by melting this polymer component and then subsequently cooling the preform to stabilize the preform.

The use of layers of mutually parallel juxtaposed multifilament reinforcement threads or unidirectional fabrics enables the production of fibre composite components with a targeted adaptation to the stresses acting on the component in the application in order to obtain high strength in the respective stress directions. In this case, when using multiaxial layers or multiple layers of unidirectional fabrics, low specific weights may be achieved by adaptation of the fibre densities and fibre angles to the stress directions present in the component.

For the production of the preforms, it is important that the starting materials used in this case, such as the scrim of mutually parallel juxtaposed multifilament reinforcement threads or the unidirectional fabric or even the multi-axial layers produced therefrom, have sufficient stabilities and formabilities to ensure good handling and drapeability.

U.S. Pat. No. 4,680,213 describes a textile that consists of reinforcement fibres and that is shaped to ensure good permeability. To achieve this, unidirectionally oriented reinforcement fibres are adhesively bonded with so-called binding fibres. The binding fibres keep the reinforcement fibres at a distance from each other. These distances create gaps in the textile that may range from a few millimetres to five millimetres. These gaps create a permeability in the textile. The binding fibres may be made of a meltable material (for example polyester) or, for example, may have a core-sheath structure (high-strength fibre material, coated with, for example, polyester). In U.S. Pat. No. 4,680,213, the binding fibres are used both in the warp direction and in the weft direction, so that the resulting textile offers poor drapeability due to the bonding. The reinforcement fibres of said document do not form a sheet of juxtaposed multifilament reinforcement threads, and therefore the strength of the fabric is reduced as a result of the gaps. In addition, no permeability range is mentioned in the document. The setting of a permeability range would also hardly be possible with the textile of the cited document, since the gaps in the textile always run over the entire fibre length thus always resulting in high permeability.

Reinforcement fibre materials with an additional non-woven are known from EP 1 125 728, wherein the material should have very good drapeability. From FIG. 3, it can be seen that auxiliary threads 5 are woven through the layers of reinforcement fibre material. Section [0024] of EP 1 125 728 discloses that the reinforcement fibre threads are arranged parallel to each other at an interval of 0.1 to 5 mm in order to improve the permeability of a resin and thus to simplify the impregnation. Consequently, permeability is also achieved here by gaps between the reinforcement fibre threads provided in the textile (and by needling with the non-woven). A permeability range is not disclosed in this document. Nor does the document disclose that the auxiliary threads have a core-sheath structure or have a titer in the range of 10 to 40 tex.

As a result, the better impregnability of the textiles of U.S. Pat. No. 4,680,213 and EP 1 125 728 is achieved by gaps in the fibre layers which run in the direction of the fibres. As a result, gaps are created in each fibre layer over the entire length of the fibres. As a rule, the components produced from the textile thus have areas without reinforcement fibre material (resin-rich zones), which negatively influence the strength. In particular, the setting of low permeability ranges (10 to 40 $l/dm^2/min$) does not seem possible with such textiles.

EP 1 352 118 A1 discloses multiaxial fabrics in which the layers of the reinforcement fibres are held together by means of meltable threads which enable good formability of the multiaxial fabrics above the melting temperature of the threads and subsequent stabilization of the shape upon cooling. Frequently, the threads are made from thermoplastic polymers such as, for example, polyamide or polyester, as disclosed for example in EP 1 057 605.

US 2005/0164578 discloses a precursor for a composite preform comprising at least one layer of reinforcement fibre fabric and incorporating fibres in at least one of the layers which stabilize the preform when exposed to elevated temperatures and which later dissolve in the matrix resin used to produce the composite component. WO 02/16481 also discloses structures of reinforcement fibres, for example for preforms, said structures containing flexible polymer elements, for example they are introduced in the form of fibres between the reinforcement fibres or as threads connecting the reinforcement fibres together. The flexible polymer elements are made of a material which is soluble in the curable matrix material used.

According to DE 198 09 264 A1, adhesive non-wovens of thermoplastic polymers may be inserted between the layers of reinforcement fibres sewn together in the fibre-laid arrangements for fibre preforms disclosed therein. When heated above the melting temperature of the polymer constituting these non-wovens, these hotmelt adhesives enable the fibre-fabric arrangements to be deformed in a simple manner into three-dimensional structures which retain their shape after cooling with virtually no restoring forces.

EP 1 473 132 relates to multiaxial fabric and/or a method for producing this multiaxial fabric as well as preforms made from the multiaxial fabric. The multiaxial layers have intermediate layers of thermoplastic fibres between the layers of unidirectional reinforcement fibres, wherein the intermediate layers of non-woven of bicomponent fibres or hybrid non-wovens may be made of different fibres mixed together. The polymer forming the intermediate layers should be compatible with the matrix resin injected later into the preform. In particular, it is stated that the intermediate layers should be permeable to the infusion of the matrix resin and should fix the reinforcement layers during the resin infusion and thereafter. In the case of the use of epoxy resins, the non-wovens are composed of polyamide fibres. The non-wovens may be bonded to the layers of reinforcement fibres via knit stitches or via melt adhesion.

EP 1 705 269 discloses a thermoplastic fibre material of a polyhydroxyether which may be inserted, for example, in multiaxial fabrics of reinforcement fibres, for example as a non-woven between the layers of reinforcement fibres. Under the influence of heat, the polyhydroxyether material becomes viscous and sticky, so that fixation of the reinforcement fibres in a defined geometric arrangement may be achieved before their embedding in the matrix. The polyhydroxyether fibre material then later dissolves completely in the matrix material at a temperature above its glass transition temperature.

US 2006/0252334 describes scrims that consist of several layers of reinforcement fibres which are used to improve the impact strength of the components made from these layers between the reinforcement layers e.g. non-wovens made of polymeric fibres. In this case, these polymeric fibres should be soluble in the matrix resin, which, according to the description of US 2006/0252334 a uniform distribution of the polymer forming these fibres in the resin matrix is made possible compared to meltable insoluble thermoplastics.

Since the polymer fibres are soluble in the matrix material in the case of US 2006/0252334 and EP 1 705 269 and consequently dissolve with the matrix resin during the infiltration of the scrims, secure fixation of the reinforcement layers at this stage of component production is not adequately ensured.

Also described in the patent literature are substrates in the form of monolayers of multifilament reinforcement threads or single-layer unidirectional fabrics parallel to each other, which are suitable for the production of fibre preforms. Thus, EP 1 408 152 describes a substrate in the form of a unidirectional fabric in which mutually unidirectionally and parallel juxtaposed multifilament reinforcement threads are interwoven with auxiliary threads extending transversely to the multifilament reinforcement threads. The auxiliary threads may be carbon fibres, glass fibres, or organic fibres such as, for example, aramid, polyamide, PBO, PVA or polyethylene fibres. The substrates of EP 1 408 152 may also have an adhesive component, for example of a nylon or a polyester or of a thermosetting resin such as, for example, an epoxy, a phenolic or an unsaturated polyester resin. Furthermore, a first and a second resin component may be adhered to the multifilament threads of the unidirectional fabrics. The second resin component has a higher melting temperature or flow initiation temperature than the first resin component.

EP 2 233 625 discloses substrates in the form of monolayers of juxtaposed reinforcement fibre threads having a curved contour, wherein the reinforcement fibre threads are held together by auxiliary threads traversing the reinforcement fibre threads in the form of weft threads. Nylon or glass threads are preferably used as auxiliary threads, with glass threads being particularly preferably used since they do not shrink. In order to stabilize the curved shape, a resin material whose main component is a thermoplastic polymer may be applied and bonded to the substrate in a dot-like, linear, discontinuous or non-woven form.

Although EP 2 233 625 already provides substrates which have cohesion and good stability even in the case of curved contours, there is still a need for substrates with improved stability and at the same time high drapeability, an automated production method and automated processing into preforms.

There continues to be a need for unidirectional fabric manufacturing methods which simultaneously offer improved stability and high drapeability, and that are particularly well suited for automated manufacturing methods.

The present invention is therefore based on the object of providing a method for producing textile unidirectional fabric offering good dimensional stability after being formed into preforms and good and adjustable permeability to the infiltration of matrix resins. At the same time, the components produced from the textile unidirectional fabric should possess high strength characteristics, in particular under pressure, and high impact strength.

The object is achieved by a method for producing a textile unidirectional fabric wherein at least one planar layer of mutually parallel juxtaposed multifilament reinforcement threads are interwoven with each other via transverse threads, wherein transverse threads with a core-sheath structure are used, and wherein the transverse threads constituting the sheath form the first component, while a second component forms the core, wherein the first component has a lower melting temperature than the second component, the first component being a meltable thermoplastic polymer material, and wherein the juxtaposed multifilament reinforcement threads are bonded together by the first component of the transverse threads through melt bonding, wherein the transverse threads have a linear density of 10 to 40 tex measured in accordance with EN ISO 2060: 1995, and wherein multifilament reinforcement threads streets arranged side by side may be formed by interweaving the transverse threads with the multifilament reinforcement threads within the planar layer, in order to obtain a permeability of 10 to 600 $l/dm^2/min$, measured according to EN ISO 9237.

A planar layer (flat layer) of mutually parallel juxtaposed multifilament reinforcement threads is understood to mean a layer of multifilament reinforcement threads whose adjacent threads are predominantly in direct contact with each other within one layer. This results in a flat thread structure without large gaps along the fibre orientation. Gaps or alleys only arise very locally at intersections between the multifilament reinforcement thread and the transverse thread resulting from the interweaving. A majority of these gaps may be designed to converge (if so desired for reasons of permeability) in a large alley.

The size of these gaps or alleys may be influenced by selecting the fineness of the transverse thread so that, together with the type of weaving of the transverse thread, the permeability of the unidirectional fabric may be adjusted. In this way, the impregnatability of the unidirectional fabric may be advantageously adjusted without reducing the strength of the textile (and the subsequent component) or decreasing the drapeability.

Figures 2, 2A:
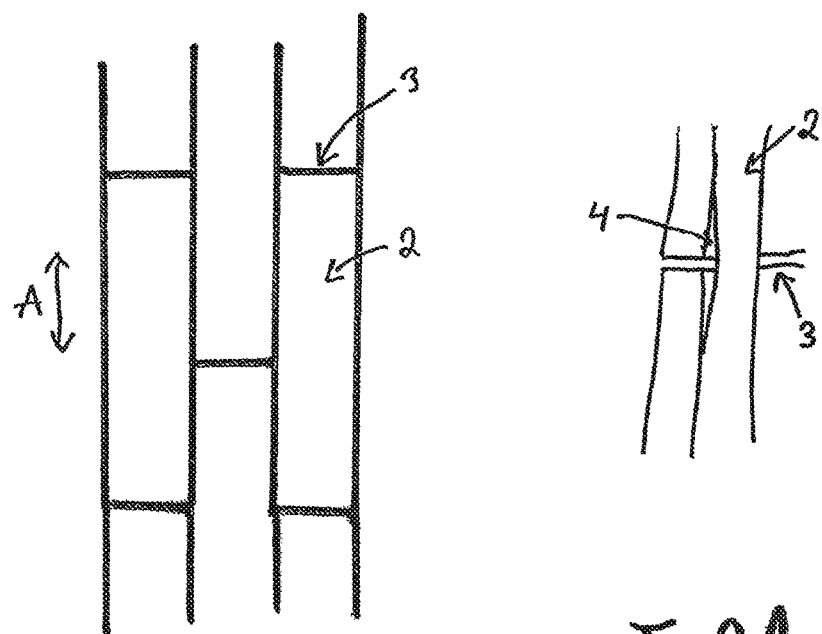

The alleys formed by the method arise locally through the interweaving of the transverse thread with the multifilament reinforcement threads, as illustrated in FIG. 2A. The alleys may also be referred to as gaps or passages.

A non-woven of thermoplastic polymer material is preferably arranged on the at least one layer of the multifilament reinforcement threads, and is adhesively bonded to the planar layer of the multifilament reinforcement threads. The bonding of the non-woven with the planar layer of the multifilament reinforcement threads is preferably carried out by the transverse threads. In other words, the first component of the transverse threads adheres the non-woven to the layer of multifilament reinforcement threads (interwoven with the transverse threads) by melt-bonding.

The permeability may be adjusted (inter alia) by a specific interweaving of the transverse threads with the multifilament reinforcement threads. Targeted weaving is to be understood as meaning that the weaving is not primarily intended to connect the transverse threads to the multifilament reinforcement threads.

The described method of producing a unidirectional fabric is novel compared with the original invention described in International Application PCT/EP/2016/070959. Although the textile substrate could also be in the form of a unidirectional fabric in the original application, no permeability could be set. By interweaving the transverse threads with the multifilament reinforcement threads as described in the parent application, a bond could only be achieved between the multifilament reinforcement threads and the transverse threads. To this end, the original application also states that the transverse threads are additionally glued to the multifilament reinforcement threads. Proper interweaving or weaving of the transverse threads, which would have led to an adjustable permeability, is not possible. Nor does the original application describe a unidirectional fabric having a permeability in the range of 10 to 600 l/dm²/min. It should be made clear that the claimed permeability range does not arise simply from the fact that the transverse threads are fastened with the multifilament reinforcement threads. Rather, the claimed permeability range is a consequence of the deliberate interweaving of the transverse threads with the multifilament reinforcement threads and the targeted selection of the titer range of the transverse threads with a core-sheath structure, which goes beyond merely fastening of the transverse threads to the multifilament reinforcement threads.

The unidirectional fabric produced by the method according to the invention have an (adjustable) permeability and are therefore particularly advantageously adaptable to subsequent processing methods. If, for example, the unidirectional fabric is provided to produce large components, one or more of these unidirectional fabrics is combined with a matrix system to form a preform. For this purpose, one or more of the unidirectional fabrics is inserted into a so-called preform, and then moulded into a preform by means of a matrix material, for example by means of a Vacuum Assistance Method (VAP), a Modified Vacuum Infusion Method MVI or a Vacuum Assistance Resin Infusion Method (VaRTM). The described methods may only be used because of the adjustable permeability of the unidirectional fabric. In the VAP method, for example, the permeability of the unidirectional fabric causes underpressure allowing trapped air and gas to escape and the complete infiltration of the unidirectional fabric by a matrix system avoiding weaknesses in the later preform. It is to be understood that different permeabilities of the unidirectional fabric may be desired depending on the selected matrix system and unidirectional fabric, and also depending on the later requirements of the unidirectional fabric. When using a highly liquid matrix material, for example, the permeability of the unidirectional fabric may be deliberately set low, for example, to achieve a deliberately slower penetration of the unidirectional fabric with matrix material. A low permeability should have a permeability in the range 10 to 40 l/dm²/min. In the case of low permeability unidirectional fabrics, air and gas may escape over a longer period during the manufacturing method. In particular, in manufacturing methods without a membrane for gas extraction, the risk of defects (sites without matrix material) is reduced in a fibre preform made with the unidirectional fabric.

An average permeability is in the range of 40 to 80 l/dm²/min and a high permeability is to be understood as meaning a permeability of more than 80 l/dm²/min, more preferably of more than 100 l/dm²/min.

Advantageously, by means of a highly adjusted permeability, the infusion time may be shortened by a factor of 6 to 15, which means a saving in the production of preforms in the hour range.

Furthermore, the adjustable permeability also affects the flow paths in the production of preforms. For example, with high permeability, auxiliary materials such as flow aids or channels may be reduced or even eliminated altogether.

Preferably, in the unidirectional fabric, a permeability of 25 to 600 l/dm²/min, more preferably 50 to 600 l/dm²/min may be set by interweaving the multifilament reinforcement threads and the transverse threads.

Further preferably, the alleys only form substantially at the point of bonding of the multifilament reinforcement thread and transverse thread. As a result, only very limited local individual alleys arise, which do not extend substantially in the direction of the thread extension direction or are present, for example, over the entire thread length. Depending on the permeability to be set, however, the interweaving of the transverse thread may be so chosen that a large continuous alley, which extends over the thread length, may arise. Locally limited (non-continuous alleys) do not produce thread-free areas in the thread extension direction that extend in the thread extension direction over the entire (or long sections of) thread length in the thread extension direction. In the prior art, such areas are free of reinforcement thread in the later component and may only have matrix material, which can reduce the strength.

The at least one planar layer of multifilament reinforcement threads arranged parallel to one another (without interweaving with the transverse threads) form a unidirectional scrim. In the context of the present invention, a unidirectional scrim is understood to mean an arrangement of at least one planar (flat) sheet-like layer of mutually parallel multifilament reinforcement threads, in which all the reinforcement threads are oriented in one direction. The interweaving of the transverse threads in the position of multifilament reinforcement threads results in a unidirectional fabric. For the purposes of the invention, it should be clear that a unidirectional scrim is a unidirectional fabric.

The mutually parallel juxtaposed multifilament reinforcement threads are woven together to form the unidirectional fabric on the transverse threads and are simultaneously connected to the transverse threads via melt adhesion. In the case of these unidirectional fabrics, the reinforcement threads which form the respective layer and are arranged parallel and adjacent to one another are connected to one another by chains of loose binding threads (transverse threads), which extend essentially transversely to the reinforcement threads. Such unidirectional fabrics are described for example in EP 0 193 479 B1, EP 0 672 776 or EP 2 233 625. Preferably, the unidirectional scrim of multifilament reinforcement threads has a single sheet of mutually parallel multifilament reinforcement threads that are arranged side by side.

The unidirectional fabric produced by the method possesses high stability against displacement of the reinforcement threads relative to each other both in the extension direction of the reinforcement threads as well as across it. This is due, on the one hand, to the fact that, in one embodiment, the non-woven of thermoplastic polymer material is adhesively bonded to the layer of the multifilament reinforcement threads. On the other hand, the core-sheath transverse threads provide further stabilization since the first melted thermoplastic polymer material component forming the sheath has a lower melting point than the second component forming the core, which results in the juxtaposed multifilament reinforcement threads being bonded together through melt bonding.

At the same time, the higher melting core component imparts sufficient lateral stability to the unidirectional fabric, even at higher temperatures, such as those encountered during the curing of matrix resins in the production of composite components from the unidirectional fabric, both in terms of shrinkage as well as possible elongation.

The present unidirectional fabric is best used to make fibre preforms by stacking one or more layers of the unidirectional fabric according to the strength requirements of the composite component to be ultimately produced, and, for example, introduced into a mould. As a result of the good drapeability of the unidirectional fabric, fibre preforms with curved contours may be produced. The superimposed layers of the unidirectional fabric may then be connected to each other, for example, through a brief temperature increase and subsequent cooling over the non-woven or over the sheath component of the transverse threads, i.e. to achieve fixation so that a stable and manageable fibre preform is obtained.

It is clear to those skilled in the art that the permeability may be adjusted by various factors. The permeability in the method according to the invention is preferably adjusted according to the type of weave (interweaving) between the multifilament reinforcement threads and the selected linear density of the transverse threads. In this case, it is particularly preferred if the transverse threads forming the textile unidirectional fabric are interwoven with the multifilament reinforcement threads in a twill or plain weave.

The interweaving of the transverse threads with the multifilament reinforcement threads preferably takes place by means of a twill weave 3/1 with 0.6 to 3 Fd/cm, preferably with 0.8 Fd/cm, a twill weave 3/1 with 0.6 to 3.0 Fd/cm, preferably with 1.1 Fd/cm, a twill weave 2/1 with 0.6 to 3.0 Fd/cm, preferably with 1.1 Fd/cm, a plain weave 1/1 with 0.6 to 3.0 Fd/cm, preferably with 1.1 Fd/cm and/or a plain weave 1/1 with 0.6 to 3.0 Fd/cm.

In the production of the unidirectional fabric, it is also conceivable that the finished unidirectional fabric may have different types of binding in different fabric areas. As a result, the unidirectional fabric may, for example, have partial areas with a higher permeability and partial areas with a lower permeability. In this way, for example, the penetration speed of the matrix system in the production of a preform from the unidirectional fabric may also be locally influenced.

In addition to the type of bond between the transverse threads and the multifilament reinforcement threads, the thread and/or thread cross-section of the multifilament reinforcement threads may also affect (to a lesser degree) the permeability of the unidirectional fabric. The multifilament reinforcement threads are preferably in the form of ribbon threads. A ribbon thread should be understood to mean a thread whose surface is substantially larger transversely to the direction of preparation of the thread than its thickness perpendicular to the direction of propagation of the thread. The transverse threads are preferably present as threads with a round cross-section.

Preferably, the titer of the transverse thread is in the range of 15 to 35 tex, more preferably in the range of 20 to 25 tex, measured according to EN ISO 2060: 1995.

Although permeability may be affected by several factors, it should be understood that the type of binding (weaving) and the transverse thread titer appear to have the greatest influence on permeability. The alley formation in the unidirectional fabric is influenced on the basis of the binding as well as the weft density in the unidirectional fabric. The unidirectional fabric becomes more open. The increased number of upper and lower threads ultimately results in many small alleys (passages or gaps) within the unidirectional fabric, which act as flow channels and thus allow a better impregnation behaviour. In certain cases, the weaving and the titer of the transverse thread may also be chosen so that the plurality of small alleys form a large alley. Surprisingly, therefore, the permeability may be adjusted over a wide range and adapted to various requirements.

Surprisingly, it has further been found that the choice of a transverse thread with a titer greater than 40 tex negatively affects the unidirectional fabric. On the one hand, there arises a significant waviness in the thread pattern of the layers of unidirectional fabric, while, on the other hand, the alleys are unintentionally large in the direction transverse to the thread extension direction. Such large alleys in the transverse direction lead to resin-rich zones not having reinforcement fibres transverse to the thread direction in the component (this may lead to a loss of strength in the later component).

In the method of producing the unidirectional fabric, the denser that the transverse thread is woven with the multifilament reinforcement threads, the higher does the permeability of the unidirectional fabric become. This may be explained by the fact that any interweaving of the transverse thread with the multifilament reinforcement thread results in a passage or gap (alley) within the unidirectional fabric at the point (binding point) at which the transverse thread is interwoven with the multifilament reinforcement thread. The transverse thread minimally shifts the multifilament reinforcement thread locally for the formation of the alley. Through this passage or gap, the matrix system may later flow through the unidirectional fabric. The alleys already described are thus created. Thus, the more closely that the transverse thread is woven with the multifilament reinforcement threads, the more alleys are formed in the unidirectional fabric and the higher the permeability.

However, the titer of the transverse thread also affects the permeability, since the alleys are larger, then the greater the selected titer of the transverse thread. However, it should be noted that too high a titer (titer greater than 40 tex) not only leads to a large alley, but causes an undesirable waviness of the thread layer of the multifilament reinforcement threads. Such waviness is undesirable because it degrades the strength of the fabric and its handleability. In addition, excessively large alleys result in thread-free areas within the multifilament reinforcement thread layer which adversely affect the strength of the unidirectional fabric and the subsequent component (made from the unidirectional fabric). Since, in the present invention, the titer of the transverse thread should not be more than 40 tex, while the transverse thread has also a core-sheath structure as claimed, the alleys usually does not lead to fibre-free zones even in the case of dense interweaving, while and high titers of the transverse thread in the later component keeps such zones small. This is because when infiltrated with matrix resin for component production, the first component (having a low melting temperature) of the transverse filament melts during infiltration, thus shrinking the alley after a certain time of matrix infiltration.

As a result, the permeability is adjustable through the weave of the transverse threads with the multifilament reinforcement threads and the selected denier of the transverse thread, wherein only a specifically selected area appears advantageous for the transverse thread denier, while the transverse thread should be present as a core-sheath thread.

As stated, the first component constituting the sheath of the transverse threads has a lower melting temperature than the second component constituting the core. Preferably, the melting temperature of the first component of the transverse threads is in the range of 70 to 150° C., and more preferably in the range of 80 to 120° C. The first component may be a polymer or a polymer blend whose melting temperature is in this range. The first component is particularly preferably a polyamide homopolymer or polyamide copolymer or a mixture of polyamide homopolymers and/or polyamide copolymers. Of these polymers, polyamide 6, polyamide 6.6, polyamide 6.12, polyamide 4.6, polyamide 11, polyamide 12 or a polymer based on polyamide 6/12, are best suited.

It is likewise preferred if the second component of the transverse threads has a melting temperature above 200° C. Particularly preferably, the second component may be a glass or a polyester, since these materials offer low shrinkage and low elongation at the temperatures prevailing in the composite component during manufacturing.

In the present unidirectional fabric, multifilament reinforcement threads may be the usual reinforcement fibres or threads used to make fibre reinforced composites. Preferably, the multifilament reinforcement threads are carbon fibre, glass fibre, or aramid threads, or ultra-high molecular weight UHMW polyethylene threads, and more preferably carbon fibre threads. In an advantageous embodiment, the multifilament reinforcement threads are present in the unidirectional fabric at a basic weight of 50 to 500 g/m$^2$. Particularly advantageous is a basic weight in the range of 100 to 300 g/m$^2$. Preferably, the multifilament reinforcement threads consist of 500 to 50,000 reinforcement fibre filaments. To achieve particularly good drapeability and a particularly uniform appearance of the unidirectional fabric, the multifilament reinforcement threads particularly preferably consist of 6000 to 24000 reinforcement fibre filaments.

Preferably, the multifilament reinforcement thread is a carbon fibre thread having a strength of at least 5000 MPa and a tensile modulus of at least 260 GPa measured according to the JIS-R-7608 standard. With regard to the carbon fibre threads used, reference is made to the still unpublished Japanese application with the file reference JP 2017-231749.

For example, the transverse threads may extend within the unidirectional fabric at right angles to the multifilament reinforcement threads. However, any other angle between the transverse threads and the multifilament reinforcement threads is possible.

For example, in the non-woven manufacturing method, the non-woven may be a short staple fleece or staple fibre fabric, or a continuous filament non-woven that needs to be consolidated, e.g. under temperature and under pressure, wherein the filaments melt at the contact points and so form the non-woven. As stated, a compound of the multifilament reinforcement threads is achieved by the non-woven on the one hand. At the same time, good drapeability is obtained. The non-woven may, for example, also be a glass non-woven or a carbon fibre non-woven, which is then adhesively bonded by means of an adhesive to the planar layer of the multifilament reinforcement threads.

The non-woven preferably consists of a thermoplastic polymer material. Such non-wovens are disclosed, for example, in DE 35 35 272 C2, EP 0 323 571 A1, US 2007/0202762 A1 or US 2008/0289743 A1. With proper selection of the thermoplastic polymer material, the non-woven may act as an impact resistance agent and further impact modifiers need not then be added to the matrix material itself in the production of the composite components. The non-woven should still have sufficient stability during the infiltration with matrix material of the fibre preforms made of the unidirectional fabric, but which preferably melt at subsequent pressing and/or curing temperatures. Therefore, preferably, the thermoplastic polymer material constituting the non-woven fabric has a melting temperature which is in the range of 80 to 250° C. For applications in which epoxy resins are used as matrix materials, for example, polyamide non-wovens have proven useful.

In a preferred embodiment, the non-woven comprises a first and a second polymer component whose melting temperature is below the melting or decomposition temperature of the second component of the transverse filaments, wherein the second polymer component has a lower melting temperature than the first polymer component. In this case, the first polymer component which is particularly preferred, is one which is insoluble in epoxy, cyanate ester or benzoxazine matrix resins or in mixtures of these matrix resins. It is particularly advantageous if the melting temperature of the first polymer component is at least as high as the curing temperature of the matrix resins.

As the first polymer component of the preferably used non-woven, conventional polymers which can be processed into thermoplastic filaments may be used, as long as they meet the above-mentioned conditions, for example, polyamides, polyimides, polyamideimides, polyesters, polybutadienes, polyurethanes, polypropylenes, polyetherimides, polysulfones, polyethersulfones, polyphenylene sulfones, polyphenylene sulfides, polyether ketones, polyether ether ketones, polyarylamides, polyketones, polyphthalamides, polyphenylene ethers, polybutylene terephthalates or polyethylene terephthalates or copolymers or mixtures of these polymers. The first polymer component of the non-woven is particularly preferably a polyamide homopolymer or polyamide copolymer, or a mixture of polyamide homopolymers and/or polyamide copolymers. In particular, the polyamide homopolymer or copolymer is a polyamide 6, polyamide 6.6, polyamide 6.12, polyamide 4.6, polyamide 11, polyamide 12 or a copolymer based on polyamide 6/12. Preferably, the first polymer component of the non-woven fabric has a melting temperature in the range of 180 to 250° C.

In an advantageous embodiment, the second polymer component of the non-woven fabric has a melting temperature in the range of 80 to 140° C. For the second polymer component of the non-woven, it is possible to use customary polymers whose melting point is in this range, such as, for example, low melting polyamide homopolymers or copolymers, as well as blends of these polymers, polyolefins, especially polyethylenes (e.g. PE-LLD, PE-HD), copolyesters, ethylene-vinyl acetates, terpolymers, e.g. acrylonitrile-butadiene-styrene copolymers (ABS), or polyhydroxyether.

In this case, in a preferred embodiment, the second polymer component may be soluble in epoxy, cyanate ester, or benzoxazine matrix resins or in mixtures of these matrix resins. Furthermore, in this case, it is particularly advantageous if the second polymer component is a polymer which reacts chemically with epoxide, cyanate ester or benzoxazine matrix resins in the crosslinking of these matrix resins. The second polymer component is then particularly preferably a polyhydroxy ether, which is already present, in particular, in epoxy resins, cyanate ester resins or benzoxazine resins during the infiltration of a fibre preform made from the present unidirectional fabric with these matrix resins, i.e. during the resin infusion method, and dissolves completely in the resin system to form the matrix resin system along with the matrix resin. The first polymer component, however, dissolves, as stated, not in the matrix system and remains both during and after the resin infusion method and also after the curing of the matrix system as a separate phase.

According to a similarly preferred embodiment, the second polymer component is insoluble in epoxy, cyanate ester or benzoxazine matrix resins or in mixtures of these matrix resins. In this case, the second polymer component of the non-woven may be, for example, a low melting polyamide homopolymer or copolymer, or blends thereof, or a polyolefin, especially a polyethylene (e.g. PE-LLD, PE-HD), a copolyester, an ethylene vinyl acetate, or a terpolymer, e.g. acrylonitrile-butadiene-styrene copolymers (ABS).

In non-wovens with a first and a second polymer component, it is of particular advantage, when the melting temperature of the first polymer component of the non-woven is in the range of 180 to 250° C., while the melting temperature of the second polymer component of the non-woven is in the range of 80 to 140° C.

The first polymer component melts particularly preferably above the curing temperature of the matrix resin used. In this way, although the first polymer component is incorporated into the matrix material, it always forms its own phase in the cured matrix resin. This separate phase formed by the first polymer component assists in curing and, in the later component, in limiting the spread of cracks and thus contributes or is crucial to increasing the impact resistance.

When the non-woven has a first higher melting polymer component and a second lower melting polymer component during manufacture of a fibre preform, then mobility of the unidirectional fabric relative to each other may be achieved when heated to a temperature above the melting temperature of the second polymer component but below the melting temperature of the first polymer component. The molten second component of the non-woven acts as a kind of lubricant, so that the layers of the reinforcement threads during the method of forming the preform, may slide into the desired position. When the preform is cooled, the second polymer component then acts as a hotmelt adhesive and fixes the reinforcement layers in their position.

In the subsequent infiltration of the fibre preform with matrix resin, which generally takes place at temperatures above the melting temperature of the second component but below the melting temperature of the first component, good permeability to the matrix resin is ensured by the higher-melting first polymer component of the non-woven. If the second polymer component according to one of the above-mentioned preferred embodiments is soluble in the matrix resin, then this component preferably dissolves completely in the matrix resin and thus loses its identity as a phase that is separate from the matrix resin. Therefore, the proportion of the second polymer component is thus attributable to the matrix material, while the proportion of matrix resin to be infiltrated may be reduced by the proportion of the second polymer component. As a result, high fibre volume fractions of the reinforcement fibres in the resulting component may be adjusted and thus the level of the mechanical strength characteristics may be kept high. At the curing temperature of the matrix resin, i.e. of the epoxy, cyanate ester, or benzoxazine resin, in a particularly preferred embodiment, the second polymer component chemically reacts with the curing matrix resin via crosslinking reactions to become an integral part of a homogeneous matrix.

In the event that the second polymer component is not soluble in epoxy, cyanate ester, or benzoxazine matrix resins or in mixtures of these matrix resins, the first polymer component also serves for mobility of the substrate layers against each other, as discussed above, so that the layers of the reinforcement threads during the method of forming the preform may slide into the desired position, and may then be cooled as the preform as a hot melt adhesive, which fixes the reinforcement layers in position. However, upon infiltration of the matrix resin and its subsequent curing, its identity as a distinct phase with respect to the matrix resin is retained, so that, in this case, the second polymer component, as well as the first polymer component, reduces the propagation of cracks, e.g. contributes to the improvement of impact resistance.

In the preferred case where the non-woven has a first polymer component with a higher melting temperature and a second polymer component with a lower melting temperature, the non-woven may consist of a mixture of monocomponent fibres of the respective polymer components, i.e. may be a hybrid non-woven. However, the non-woven may also be made of bicomponent fibres, for example core-sheath fibres, wherein the core of the fibres is composed of the higher-melting first polymer component and the sheath of the lower-melting second polymer component. When processing the unidirectional fabric with such hybrid non-wovens or bicomponent non-wovens to form fibre preforms, then the preforms, for example, also require deformation of the unidirectional fabric at a suitable heat application during deformation at temperatures above the melting point of the lower melting non-woven component but below the melting point of the higher melting non-woven component, in order to achieve good deformability, and good stabilization and fixation of the deformed fabric after cooling. In a similar manner to a non-woven of bicomponent fibres, the non-woven may also be, for example, composed of a random stratum of fibres of the first polymer component, while the second polymer component, for example, is applied by being sprayed or coated on the fibres of the first polymer component. The coating may be carried out, for example, by means of impregnation with a dispersion or solution of the second polymer component, after which the liquid fraction of the dispersion or the solvent is removed following the impregnation. It is also possible for a non-woven constructed of fibres of the first polymer component to contain the second polymer component in the form of fine particles interposed between the fibres of the first polymer component.

Preferably, the non-woven comprising a first and a second polymer component is a hybrid non-woven, i.e. a non-woven of a mixture of monocomponent fibres having different melting temperatures. As stated, particularly preferably, the first polymer component with a higher melting temperature has a melting temperature in the range from 180 to 250° C. At such temperatures, the portion of the non-woven consisting of the first polymer component only melts above the temperatures typically encountered in the injection of the matrix resin. Thus, since the first polymer component does not melt at the resin injection temperature, good dimensional stability of the unidirectional fabric is ensured at this stage.

With regard to the properties of the composite components produced using the present unidirectional fabrics, in particular with regard to their impact strength and their matrix contents, it is advantageous if the non-woven comprises the first polymer component in a proportion of 60 to 80% by weight and the second polymer component in a proportion of 20 to 40% by weight. Overall, it is preferred if the non-woven present in the unidirectional fabric has a basic weight in the range of 3 to 25 g/m² and, particularly preferably, a basic weight in the range of 5 to 15 g/m².

The non-woven preferably has a thickness, measured perpendicularly to the main extension direction of the non-woven, of less than 60 µm, more preferably less than 30 µm, and particularly preferably in the range of 10 to 30 µm, measured according to DIN EN ISO 9073-2.

In particular, in cases where the non-woven of the unidirectional fabric has only a higher temperature melting polymer component, i.e. for example, only a polymer component whose melting temperature is in the range of 180 to 250° C., the unidirectional fabric in a preferred embodiment, at least one of the surfaces of the sheet of multi-filament reinforcement further comprises threads of a binding material whose main component is a thermoplastic polymer or an epoxy resin that is solid at room temperature based on bisphenol A and which is discontinuously applied to the sheet layer of the multifilament reinforcement threads and adhesively bonded to the multifilament reinforcement threads. A discontinuous application is understood to mean that the binding material is applied in dots, linearly or in any other way, on the surface, without a closed layer of the binding material being present. Preferably, the binding material is present in a concentration of 1 to 5% by weight of the basic weight of the multifilament reinforcement threads.

In a particularly preferred embodiment of the unidirectional fabric, the binding material may be based on a powdery material and is applied in a punctiform manner to the planar layer of the multifilament reinforcement threads. This may be achieved by sprinkling the powdered binding material onto the surface of the layer of multifilament reinforcement threads arranged parallel to one another and fixing it on the surface by melting.

As thermoplastic polymers for the binding material, polyvinyl acetate, polycarbonate, polyacetal, polyphenylene oxide, polyphenylene sulfide, polyallylate, polyester, polyamide, polyamideimide, polyimide, polyetherimide, polysulfone, polyethersulfone, polyetheretherketone, polyaramid, polybenzoimidazole, polyethylene, polypropylene or cellulose acetate may preferably be used.

Preferably, the melting temperature of the binding material is in the range of 80 to 120° C. The binding material may alone have the task of connecting successive layers of the unidirectional fabric in the production of fibre preforms by heating to a temperature above the melting temperature of the binding material and subsequent cooling together in order to fix them against each other. In addition, the binding material may contribute to the stabilization of the fibre preform, e.g. a deformation of the layers of the unidirectional fabric in the formation of the fibre preform. Finally, however, it is also possible that the binding material may be selected to contribute to an improvement in the mechanical properties of the composite component made from the fibre preform, e.g. improves the impact resistance of the component. For this purpose, it is advantageous if the binding material is a thermoplastic material having a high toughness, or a mixture of such a thermoplastic polymer with an epoxy resin that is solid at room temperature based on bisphenol A.

Due to its specific structure, the unidirectional fabric is characterized by good drapeability and fixability of the substrate layers in the fibre preform or in the preform, and by good and adjustable permeability in the infiltration with matrix resin for component production of the preform, and in components offering high mechanical strength and high impact resistance. Therefore, the present invention particularly also relates to a fibre preform or a preform for producing a composite component which comprises a unidirectional fabric according to the invention.

By combining the multifilament reinforcement threads with the transverse threads and, optionally, simultaneously with the non-woven and optionally with the binding material in the form of an adhesive compound, the unidirectional fabric obtains a high degree of dimensional stability, since excellent bonding of the multifilament reinforcement threads relative to each other is obtained by the adhesive bonds. Thus, not only unidirectional fabrics in which the multifilament reinforcement threads are in a straight form adjacent to each other as well as in parallel with each other, but unidirectional fabrics having a curved shape may also be obtained. A preferred embodiment therefore relates to a unidirectional fabric in which the at least one planar layer of mutually parallel juxtaposed multifilament reinforcement threads has a curved contour in which the multifilament reinforcement threads are arranged parallel to a circumferential direction of the curved contour and each multifilament reinforcement thread independently follows the associated trajectory of the circumferential direction of the curved contour, while the trajectories of each multifilament reinforcement threads have a common centre of curvature.

In such a unidirectional fabric having a curved shape or contour, the multifilament reinforcement threads run parallel to a direction (0° direction) along a circumferential direction of the curved contour. Unlike layers in which the multifilament reinforcement threads are arranged adjacent and parallel to each other and have a straight linear course, the multifilament reinforcement threads in the unidirectional fabric having a curved contour are also arranged adjacent and parallel to each other, but on different curved trajectories having a common centre of curvature. The transverse threads here also extend in a direction traversing the multifilament reinforcement threads and transversely to the multifilament reinforcement threads. This curved contour is retained due to the high dimensional stability and as a result of the configuration of the present unidirectional fabric, in particular by the transverse threads of a core-sheath structure of two components, as well as in subsequent processing steps for the fibre preform or composite component. In this case, further stabilization is obtained in unidirectional fabrics which have a non-woven and in which the non-woven of thermoplastic polymer material comprises a first polymer component and a second polymer component which have the properties described above.

A further object of the present invention relates to a fibre preform for the production of composite components, wherein the fibre preform is produced by means of a textile unidirectional fabric, as has been described above.

The invention will be described by means of experiments and figures.

Figure 1A:
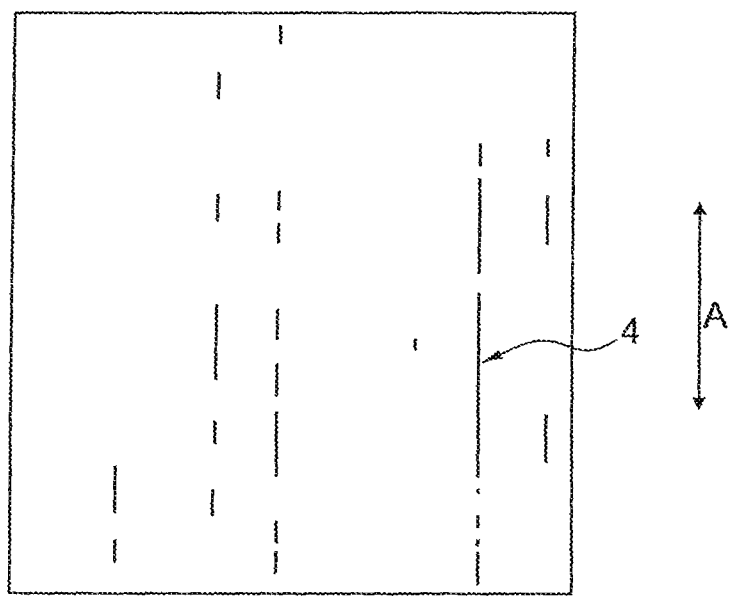

FIG. 1 shows schematically a unidirectional fabric with a twill weave 3/1 with 0.8 threads per centimetre. FIG. 1A shows a view of such a fabric.

Figure 2B:
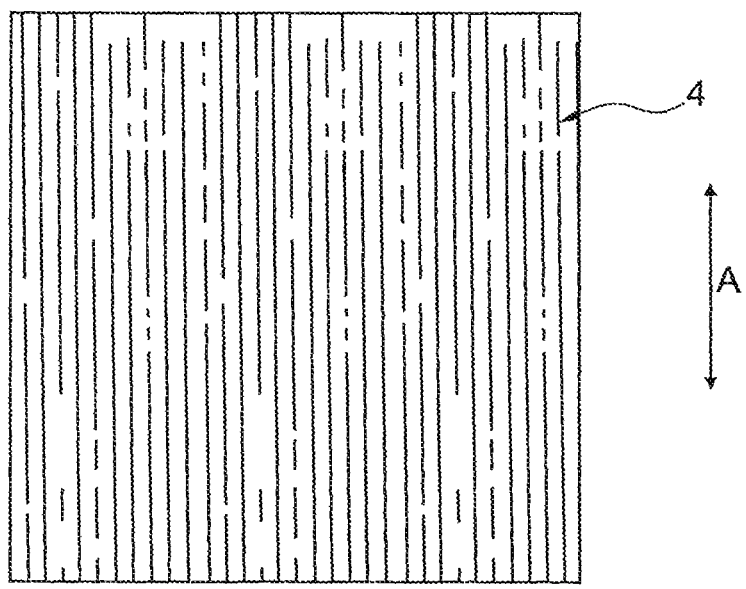

FIG. 2 shows schematically a unidirectional fabric. FIG. 2A shows schematically the view of a unidirectional fabric with a plain weave 1/1 and 3.0 threads per centimetre. FIG. 2B shows schematically a detailed representation of the formation of alleys in a unidirectional fabric.

FIG. 1 shows a schematic representation of a unidirectional fabric 1 with a twill weave 3/1 with 0.8 threads per centimetre. The multifilament reinforcement thread 2 exists as a ribbon thread. Transverse threads 3 are interwoven with the multifilament reinforcement threads 2 in the direction of the arrow B, wherein the interweaving does not contribute significantly to a stabilization of the unidirectional fabric 1. The unidirectional fabric 1 is stabilized by gluing the transverse threads 3 to the multifilament reinforcement threads 1.

FIG. 1A shows the view of a unidirectional fabric 1 according to FIG. 1. In the view, alleys 4 may be represented, since at the locations of the alleys 4, light passes through the unidirectional fabric 1 and becomes visible as bright stripes. The multifilament reinforcement threads 2 run along the arrow A. The multifilament reinforcement threads 2 are displaced at the bonding points through the transverse threads 3, so that the alleys 4 are formed. Some of the alleys 4 may form a large alley, if desired for permeability. However, FIG. 1A clearly shows that the alleys 4 may only be present very locally in the unidirectional fabric 1. In particular, this makes it possible to set low permeabilities or to set different permeability areas within the unidirectional fabric 1.

FIG. 2 schematically shows the thread pattern of the multifilament reinforcement threads 2 of a unidirectional fabric 1. In the illustration, a single layer of the unidirectional fabric 1 is shown at a distance, wherein the alleys 4 are not recognizable by the distance.

FIG. 2A schematically shows a detail of the interweaving of multifilament reinforcement thread 2 with the transverse threads 3. Through the transverse threads 3 with which the multifilament reinforcement thread 2 was woven, in the unidirectional fabric 1 at the binding point, alleys 4 (or passages or gaps) are formed, through which a matrix material can flow into the unidirectional fabric 1. The permeability of the unidirectional fabric may be adjusted by the number of alleys 4 in the unidirectional fabric 1. The number of alleys 4 in the unidirectional fabric 1 may be adjusted particularly well on the basis of the binding during the interweaving of the transverse threads 3 with the multifilament reinforcement threads 2 and the choice of the transverse thread titer. By the selective selection of the transverse thread titer, the multifilament reinforcement thread 2 is slightly displaced to a position of the layer of multifilament reinforcement threads to form a single alley 4. The alley 4 does not extend along the thread propagation direction (arrow A) over the majority of the thread length. Rather, the alleys 4 arise only very locally at the binding point between the multifilament reinforcement thread 2 and the transverse thread 3.

FIG. 2B schematically shows a unidirectional fabric 1 in a transparent view with plain weave 1/1 and 3.0 threads per centimetre. In this particular case, the alleys 4 have been merged into large alleys to achieve a high permeability. Since, however, a core-sheath thread is used as the transverse thread 3, the layer infiltrated with matrix resin may again have only small alleys 4, despite the large alleys now shown in the transparent view. This effect may be achieved by the first component of the transverse thread 3 melting during the infiltration and thus closing the alley 4 during the infiltration. In such a case, the multifilament reinforcement thread 2 may be shifted back again so that the alley 4 becomes smaller.

The binding through the weave in FIG. 1 is significantly smaller than the binding through the weave in FIG. 2. Thus, FIG. 1 shows a less densely woven unidirectional weave 1 than FIG. 2. However, it can be clearly seen that in the unidirectional weave 1 of FIG. 2, a larger number of alleys 4 and also large (longer) alleys are formed than in the unidirectional fabric of FIG. 1. As a result, a loose bond leads to lower permeability than a firm bond (achieved by the interweaving of the transverse thread 3 with the multifilament reinforcement threads 2).

The setting of different permeabilities will be described in more detail by means of examples.

Tenax© E IMS65 E23 24K 830 tex threads were used in all tests as the multifilament reinforcement thread for the construction of the unidirectional fabric, and which had a flat cross-section of about 7 mm (so-called ribbon threads). The set fibre surface weight results in a ribbon width of about 3 mm in the unidirectional fabric.

All tests were made without an additional non-woven on the unidirectional fabric (UD). A possible non-woven may be so open structurally that it has no effect on the permeability.

To make the unidirectional fabric, the multifilament reinforcement threads were interwoven with the transverse threads. In Example 1, the same bond types but with different weft thread densities were selected for the unidirectional fabrics UD 2 to UD 3 (see Table 1). In Example 2, UD 4 and UD 3, as well as UD 5 and UD 6, differed by the titer of the weft thread used (Table 2). The following threads were used for the transverse threads:
1. 20 tex—type EMS-Grilon C-85
2. 29 tex core: glass Vetrotex EC-5 5.5 tex+2×EMS Grilon K-110 wound
3. 35 tex core: glass Vetrotex EC-5 11 tex+2×EMS Grilon K-110 wound The air permeability of the unidirectional fabrics thus formed was measured according to the test standard EN ISO 9237, wherein an air pressure of 200 Pa was used. The result gives a direct conclusion to the permeability of the investigated unidirectional fabric.

Example 1: Identical Weft Thread (Transverse Thread), Variation of the Binding

TABLE 1

| Designation | Carbon material fibre | Fibre weight | Weft thread | Binding | Weave Fd/cm | Air permeability | Change |
|---|---|---|---|---|---|---|---|
| UD-1 | Tenax © -E IMS65 E23 24K 830tex | 268 g/m' | 35tex | Twill weave 3/1 | 0.8 | 25.1 l/dm'/min | 100% |
| UD-2 | Tenax © -E IMS65 E23 24K 830tex | 268 g/m' | 35tex | Plain weave | 1.1 | 89.9 l/dm'/min | 358% |
| UD-3 | Tenax © -E IMS65 E23 24K 830tex | 268 g/m' | 35tex | Plain weave | 3.0 | 494.0 l/dm'/min | 1968% |

Example 2: Identical Binding, Variation of the Weft Thread (Transverse Thread)

TABLE 2

| Designation | Carbon material fibre | Fibre weight | Weft thread | Binding | Weave Fd/cm | Air permeability | Change |
|---|---|---|---|---|---|---|---|
| UD-4 | Tenax © -E IMS65 E23 24K 830tex | 268 g/m$^2$ | 29 tex | Plain weave | 3.0 | 297.0 l/dm$^2$/min | 100% |
| UD-3 | Tenax ©-E IMS65 E23 24K 830tex | 268 g/m$^2$ | 35 tex | Plain weave | 3.0 | 494.0 l/dm$^2$/min | 166% |
| UD-5 | Tenax © -E IMS65 E23 24K 830tex | 268 g/m$^2$ | 20 tex | Twill weave 3/1 | 0.8 | 14.8 l/dm$^2$/min | 100% |
| UD-6 | Tenax © -E IMS65 E23 24K 830tex | 268 g/m$^2$ | 35 tex | Twill weave 3/1 | 0.8 | 25.1 l/dm$^2$/min | 170% |

The binding of the unidirectional fabric is understood to mean the combination of the type of binding and the number of weft threads per centimetre.

As can be clearly seen in example 1, a loose plain weave leads to improved permeability of the unidirectional weave compared to a stronger twill weave. When using the same type of binding for UD 2 and UD 3, the number of weft threads per centimetre decides how dense the unidirectional fabric is woven. With a denser unidirectional fabric (UD 3 compared to UD 2), the air permeability, and thus also the permeability, is significantly higher.

Example 2 shows that a variation in the fineness of the weft thread with the same type of binding and the same ratio of weft threads per centimetre also leads to a change in permeability. In general, all examples show that the permeability of the unidirectional fabric may be adjusted. The desired permeability may be influenced by the interweaving of the multifilament reinforcement threads with the transverse thread, and by the fineness of the transverse thread and the core-sheath structure of the transverse thread. Surprisingly and completely unexpectedly, it has been shown that a tightly woven unidirectional fabric has a higher permeability than a loosely woven unidirectional fabric.

The invention claimed is:

1. A method for producing a textile unidirectional fabric, wherein at least one flat layer of mutually parallel juxtaposed multifilament reinforcement threads is interwoven with transverse threads, wherein the transverse threads comprise a core-sheath structure, wherein the transverse threads comprise a first component constituting the sheath and a second component constituting the core, wherein the first component has a lower melting temperature than the second component, and wherein the first component is a meltable thermoplastic polymer material, and wherein the first component of the transverse threads is bonded together with the juxtaposed multifilament reinforcement threads by melt bonding, the transverse threads having a linear density of 10 to 40 tex, measured according to EN ISO 2060: 1995, and wherein the textile unidirectional fabric comprises alleys that provide a permeability of 10 to 600 l/dm$^2$/min, measured according to EN ISO 9237.

2. The method according to claim 1, wherein a non-woven of thermoplastic polymer material is arranged on and is adhesively bonded to the at least one flat layer of the multifilament reinforcement threads.

3. The method according to claim 2, wherein the non-woven has a basic weight in the range of 3 to 25 g/m$^2$.

4. The method according to claim 2, wherein the non-woven has a thickness, measured perpendicular to a propagation direction of the non-woven, of less than 60 μm, measured according to DIN ISO 9073-2.

5. The method according to claim 2, wherein the non-woven comprises a first polymer component and a second polymer component, wherein the first polymer component has a melting temperature below the melting or decomposition temperature of the second component of the transverse threads and is not soluble in matrix resins of epoxy, cyanate ester, or benzoxazine or mixtures of these matrix resins, wherein the second polymer component has a lower melting temperature than the first polymer component.

6. The method according to claim 1, wherein the permeability is more than 25 l/dm$^2$/min, and/or the alleys are substantially formed only in an area of binding points of the interwoven of the multifilament reinforcement threads and transverse threads.

7. The method according to claim 1, wherein the transverse threads are woven with the multifilament reinforcement threads to form the textile unidirectional fabric in a twill or plain weave.

8. The method according to claim 7, wherein a twill weave 3/1 with 0.8 to 3.0 Fd/cm, a twill weave 3/1 with 0.8 to 3.0 Fd/cm, a twill weave 2/1 with 0.8 to 3.0 Fd/cm, a plain weave 1/1 with 0.8 to 3.0 Fd/cm and/or a plain weave 1/1 with 0.8 to 3.0 Fd/cm, is used for interweaving the transverse threads with the multifilament reinforcement threads.

9. The method according to claim 1, wherein a component having a melting temperature in the range of 70 to 150° C. is used for the first component of the transverse threads.

10. The method according to claim 9, wherein the first component of the transverse threads is a polyamide homopolymer or polyamide copolymer, or a mixture of polyamide homopolymers and/or polyamide copolymers.

11. The method according to claim 1, wherein a component with a melting temperature above 200° C. is used as the second component of the transverse threads.

12. The method according to claim 1, wherein glass or a polyester is used as the second component of the transverse threads.

13. The method according to claim 1, wherein the transverse threads have a titer in the range of 15 to 35 tex, measured according to EN ISO 2060: 1995.

14. The method according to claim 1, wherein carbon fibre, glass fibre' aramid threads, or ultra-high molecular weight (UHMW) threads are used as the multifilament reinforcement threads.

15. The method according to claim 1, wherein the multifilament reinforcement threads comprise a carbon fibre thread having a strength of at least 5000 MPa measured according to JIS R-7608 and a tensile modulus of at least 260 GPa, measured according to JIS R-7608.

16. The method according to claim 1, wherein the at least one flat layer of mutually parallel juxtaposed multifilament reinforcement threads has a curved contour, in which the multifilament reinforcement threads are arranged parallel to a circumferential direction of the curved contour, and wherein and each of the multifilament reinforcement threads follows the circumferential direction of the curved contour, while trajectories of the multifilament reinforcement threads have a common centre of curvature.

17. A fibre preform for production of composite components, wherein the fibre preform comprises a textile unidirectional fabric prepared according to claim 1.

* * * * *